(12) United States Patent
Sokolov et al.

(10) Patent No.: US 10,457,560 B1
(45) Date of Patent: Oct. 29, 2019

(54) SYNTHESIS OF MESOPOROUS SILICA SHAPES USING SODIUM SILICATE AS A SILICA SOURCE

(75) Inventors: Igor Sokolov, Potsdam, NY (US); Sajo P. Naik, Laramie, WY (US)

(73) Assignee: Clarkson University, Potsdam, NY (US)

(*) Notice: Subject to any disclaimer, the term of this patent is extended or adjusted under 35 U.S.C. 154(b) by 0 days.

(21) Appl. No.: 12/229,001

(22) Filed: Aug. 19, 2008

Related U.S. Application Data

(60) Provisional application No. 60/996,836, filed on Dec. 7, 2007.

(51) Int. Cl.
| | | |
|---|---|---|
| *C01B 33/113* | (2006.01) | |
| *C01B 33/18* | (2006.01) | |
| C01B 37/02 | (2006.01) | |
| C01B 33/187 | (2006.01) | |
| C01B 33/193 | (2006.01) | |

(52) U.S. Cl.
CPC ............ *C01B 33/113* (2013.01); *C01B 33/18* (2013.01); *C01B 33/185* (2013.01); *C01B 33/187* (2013.01); *C01B 33/193* (2013.01)

(58) Field of Classification Search
CPC ..... C01B 33/113; C01B 33/18; C01B 33/185; C01B 33/187; C01B 33/193
USPC ................................ 423/326, 332, 335–340
See application file for complete search history.

(56) References Cited

PUBLICATIONS

Naik et al., Morphology Control of Mesoporous Silica Particles, Jul. 6, 2007, J. Phys. Chem, 111, 11168-11173.*
Sierra et al., Preparation of mesoporous silica particles with controlled morphology from sodium silicate solutions and a non-ionic surfactant at pH values between 2 and 6, Microporous and Mesoporous Materials, 2000, 39, 519-527.*
Boos at al., Optical properties of Co2+-doped silica gel monoliths, Journal of Non-Crystalline Solids, 1994, 176, 172-178.*
Template-Assisted Synthesis of Mesoporous Magnetic Nanocomposite Particles by Wu, Zhu, and Xu, Funct. Mater. Apr. 14, 2004.
"3D Design of Self-Assembled Nanoporpous Colloids" by Lokolov and Y. Kievsky—Studies in Surface Science and Catalysts. vol. 156. 2005.

* cited by examiner

*Primary Examiner* — James A Fiorito
(74) *Attorney, Agent, or Firm* — Bond Schoeneck & King, PLLC; George McGuire

(57) ABSTRACT

This invention describes the self-assembly of meso(nano) porous silica particles from inorganic an inexpensive silica precursor, sodium silicate. The particles have a well defined shape, high surface area, and high uniformity of the pore size, the properties that are typically found for high quality mesoporous material synthesized from organic silica precursors. The disclosure illustrates a synthesis of hard spheres, discoids, and a mixture comprising discoids, gyroids and fibers, termed as origami.

33 Claims, 11 Drawing Sheets

SYNTHESIS OF MESOPOROUS SILICA SHAPES USING SODIUM SILICATE AS A SILICA SOURCE

CROSS REFERENCE TO RELATED APPLICATIONS

This application claims the benefit of U.S. Provisional Application No. 60/996,836, filed Dec. 7, 2007.

GOVERNMENT RIGHTS

This invention was made with government support under Grant Number W91INF-05-1-0339 awarded by US Army Research Office. The government has certain rights in the invention.

FIELD OF INVENTION

We disclose a novel method for the synthesis of micrometer-sized meso (nano) porous silica particles in various shapes from an inexpensive inorganic silica precursor, sodium silicate.

BACKGROUND OF THE INVENTION

Mesoporous silica as discussed by: T. Yanagisawa et al. (1), C. T. Kresge et al. (2), and J. S. Beck et al. (3), (listed in the reference list below and incorporated herein by reference) is an important class of self-assembled inorganic materials consisting of regularly arranged mesoporous channels in the amorphous silicon dioxide network. Because of their large specific surface area, high pore volume, uniform pore diameter and high thermal stability, mesoporous silica has been envisaged to be a promising material in adsorption, catalysis, and ultrafiltration, so also as a host for deposition of clusters, nanodots and nanowires etc.

Mesoporous silica exhibiting lamellar, hexagonal (p6 mm), or cubic (1a3d, Im3m, Pm3n, etc.) structures and presenting a host of pore arrangements have already been prepared under different preparative conditions. See T. Yanagisawa et al. (1), C. T. Kresge et al. (2), J. S. Beck et al. (3), D. Zhao et al (4), D. Zhao et al. (5), and H. Yang et al. (6), (all listed below and all incorporated herein by reference). It has been realized that the control over the particle morphology and the internal mesoporous architecture could open up new possibilities for their usage as a carrier for functional molecules for advanced applications-in lasers and optics. For example, see B. J. Scott et al. (7). F. Marlow et. al.. (8), and I. Sokolov et al. (9), all listed in the reference list below and all hereby incorporated herein by reference.

Previously, mesoporous silica particles of different morphology have been synthesized using alkyl orthosilicates as silica source together with ionic or block copolymer surfactants as structure directing agents (SDAs) under basic or acidic preparative conditions. See G. A. Ozin et al. (10). Q. Huo et al. (11), S. Schacht et al. (12), X. Pang et al. (13), K. Kosuge et al. (14) X. Pang et al (15), S. Han et al. (16), S. P. Naik et al. (17), and Y. S. Lin et al (18), all listed in the reference list below and all hereby incorporated herein by reference. However, due to their high costs, storage and handling problems, replacement of alkylsilicates by other economical and more robust sources of silica is much desired to realize their anticipated commercial applications. See A. Berggren et al. listed in the reference list below and hereby incorporated herein by reference. Sodium silicates represent an example of economical and robust sources of silica. There have already been several reports on the synthesis of mesoporous silica fibers and spheres using sodium silicates as a silica source. See X. Pang et al., K. Kosuge et al., X. Pang et al., S. Han et al., and S. P. Naik et al. listed in the reference list below and all hereby incorporated herein by reference. Nonetheless, many of these methods involve use of organic solvents or mixtures of surfactants and complex procedures for the synthesis of mesoporous silica particles. Moreover, synthesis of well-formed mesoporous silica particles having a circular internal architecture and pore channels running around the particle axis using sodium silicate as a silica source has not been reported using inorganic silica sources. Mesoporous silica with such morphology is useful in applications involving maximum retention of the occluded species inside the mesostructure for an extended period of time. See I. Sokolov et al. listed in the reference list below and hereby incorporated herein by reference.

SUMMARY

This disclosure describes a novel method for the synthesis of micrometer-sized meso (nano) porous silica particles in various shapes from an inexpensive inorganic silica precursor. The disclosure illustrates a synthesis of hard spheres, discoids, and a mixture comprising discoids, gyroids and fibers, termed as origami. The particles have a well-defined shape, high surface area, and high uniformity of the pore size, the properties that are typically found for high quality mesoporous material synthesized from organic silica precursors.

The process includes preparation of nanoporous silica particles, either fibers or discoids or a mix of fibers and discoids using an inorganic silica precursor such as a sodium silicate. The structure directed agent (SDA) is chosen among either ionic or copolymer surfactants or a mix of the above. Specific examples of surfactant can be either cetyltrimethylammonium chloride or cetyltrirmethylammonium bromide or plurionic acid.

The condensation catalyst is chosen among strong acids comprising of hydrochloric or nitric or sulfuric or phosphoric acids, or a mix of the above.

The synthesis is carried out using the molar sol composition: $1Na_2SiO_3.9H_2O$: X CTAC: Y HCl: Z $H_2O$. X can be chosen as any from the range 0.5-3, and Y can be chosen as any from the range 10-70, and Z can be chosen as any from the range 600-800. The surface areas of the obtained particles are higher than 1000 $m^2/g$; pore diameters are 2.4-2.5 nm, and pore volumes are 0.93 $cm^3$-0.96 $cm^3/g$. The process is done in room temperature (15-25° C.) to synthesize preferentially fibers. The process is done at 60-90° C. temperature to synthesize preferentially discoids. The preparation of nanoporous silica particles, either spheres, or discoids, or origami-type use an inorganic silica precursor, such as sodium silicate. The structure directed agent (SDA) is chosen among either ionic or copolymer surfactants or a mix of the above. The surfactant can be either cetyltrimethylammonium chloride or cetyltrimethylammonium bromide or plurionic acid.

The condensation catalyst is chosen among strong acids comprising of hydrochloric or nitric or sulfuric or phosphoric acids, or a mix of the above.

The synthesis of spheres is carried out using the following the molar sol composition: $1Na_2SiO_3.9H_2O$: X $CH_3NO$: Y CTAC: $210H_2O$. X can be chosen as any from the range 5-32 and Y can be chosen as any from the range 0.5-0.8. The synthesis of spheres is carried out using molar sol composition: $1Na_2SiO_3.9H_2O$: 22 $CH_3NO$: 0.5 CTAC: $210H_2O$. The surface area of the spheres is at least 600 $m^2/g$, the pore diameter and pore volumes are 3.3 nm, and 0.3 $cm^3/g$, respectively.

The synthesis of discoids synthesized from the sols of molar compositions 1 $Na_2SiO_3.9H_2O$: 0.5-0.8 CTAC: $210H_2O$: 16 HCl. The synthesis of origami particles is synthesized from the sols of molar compositions $1Na_2SiO_3.9H_2O$: 5-32 $CH_3NO$: 0.5-0.8 CTAC: $210H_2O$: 16 HCl The surface areas of the particles is at 500-900 $m^2/g$, whereas the pore diameter and volume are in the range of 2.4-3.3 nm, and 0.2-0.4 $cm^3/g$, respectively.

With this process the surface areas of the particles is at 500-900 $m^2/g$, whereas the pore diameter and volume are in the range of 2.4-3.3 nm, and 0.2-0.4 $cm^3/g$, respectively.

A second process of synthesizing mesoporous silica fibers and discoids also uses disodium trioxosilicate ($Na_2SiO_3.9H_2O$) as a silica source; cetyltrimethylammonium chloride (or bromide) (CTAC, 25% aqueous) as a structure directed agent (SDA) in a presence of hydrochloric acid as a catalyst, wherein a molar sol composition is at the range of $1Na_2SiO_3.9H_2O$: 0.5-3CTAC: 10-70HCl: 600-800$H_2O$. The process includes fixing the molar sol composition at $1Na_2SiO_3.9H_2O$: 1.5CTAC: 28HCl: 730$H_2O$.

The process further includes dissolving 1.6 g of $Na_2SiO_3.9H2O$ in 55.2 g $H_2O$ in a high density polypropylene (HD-PP) bottle and stirring for 15 minutes. Then slowly add 16 g of concentrated HCl 11.2 g CTAC in a. HD-PP bottle and stirring for 2 minutes. This is followed by slowly adding said clear sodium silicate solution to said CTAC/HCl solution and stirring for 5 minutes and maintaining a resulting sol at fixed temperature between 4°-70° C., depending on the desired ratio between fibers and discoids for 6-24 hours under quiescent conditions (standing steady, with no external mixing of shaking). This is followed by recovering a product by filtration, then washing several times with distilled water, and subsequently, drying for several hours.

A next process of synthesizing mesoporous silica particles also using disodium trioxosilicate ($Na_2SiO_3.9H_2O$) as a silica source, cetyltrimethylammonium chloride (CTAC, 25% aqueous) as a structure directed agent (SDA) in the presence or absence of formamide and hydrochloric acid as a catalyst. The process of synthesizes mesoporous silica spheres in the absence of HCl from sols of molar compositions $1Na_2SiO_3.9H_2O$: 5-32 $CH_3NO$: 0.5-0.8 CTAC: $210H_2O$. A preferred sol of molar composition is 1 $Na_2SiO_3.9H_2O$: 22 $CH_3NO$: 0.5 CTAC: $210H_2O$. For the synthesis of discoids, the process uses a molar composition of the sol maintained at $1Na_2SiO_3.9H_2O$: 0.5-0.8 CTAC: $210H_2O$: 16 HCl. For the synthesis of origami shapes, the process uses a molar composition of the sol maintained at $1Na_2SiO_3.9H_2O$: 5-32 $CH_3NO$: 0.5-0.8 CTAC: $210H_2O$: 16 HCl.

DESCRIPTION OF THE DRAWINGS

These and other features, aspects, and advantages of the present invention will become better understood with regard to the following description, appended claims, and accompanying drawings where:

FIGS. 7(A)-(B) illustrate optical images of the as-synthesized and calcined spheres obtained from the sol of molar composition $1Na_2SiO_3.9H_2O$: 21.69 $CH_3NO$: 0.51 CTAC: 210 $H_2O$ with the inset (C) in illustrating the scanning electron microscopy (SEM) image of an individual broken sphere;

DESCRIPTION

Figure 1:
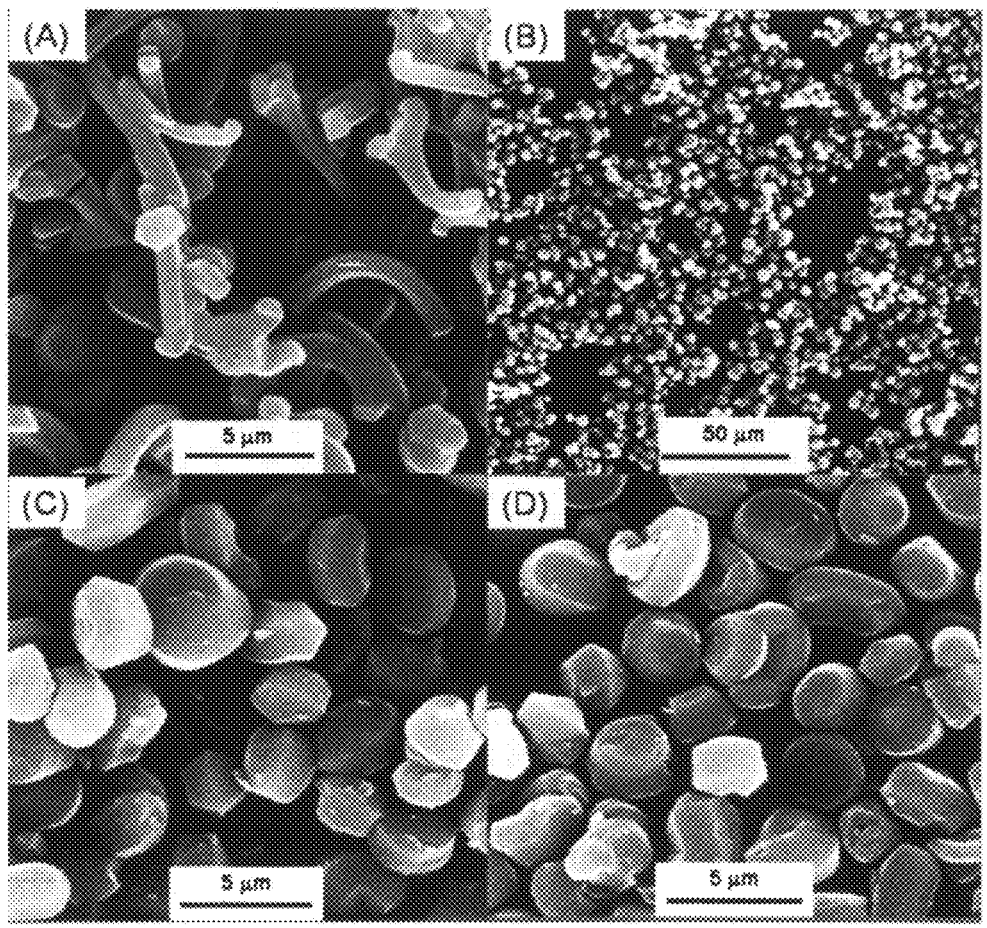
FIG. 1(A) illustrates a scanning electron microscopy (SEM) image of a mixture of mesoporous silica fibers synthesized from the sol of molar composition $1Na_2SiO_3.9H_2O$: 1.5CTAC: 28HCl: 729$H_2O$ at 25° C., 24 hours.
FIGS. 1(B) and (C) illustrate mesoporous silica discoids synthesized from the same sol but at a range between 70° C. and 90° C., 24 h.
FIG. 1(D) illustrates calcined discoids.

Herein we disclose a procedure of the synthesis of nanoporous silica particles of various shapes using sodium silicate (disodium trioxosilicate is a particular example) as a silica source. It is a robust process. We demonstrate that by adjusting the reaction sol composition, hard spheres, discoids or a mixture of various shapes, termed as origami, comprising gyroids, fibers and discoids can be obtained. The description below uses numbers as exemplary values.

Example 1: Synthesis of Fibers and Discoids

Mesoporous silica fibers and discoids are synthesized using disodium trioxosilicate ($Na_2SiO_3.9H_2O$) as the silica source: cetyltrimethylammonium chloride (or bromide) (CTAC, 25% aqueous) as an example of the structure directed agent (SDA) in the presence of hydrochloric acid as an example of a catalyst. The molar sol composition is at the range of $1Na_2SiO_3.9H_2O$: 0.5-3CTAC: 10-70HCl: 600-800$H_2O$. For the example given below, it is fixed at, $1Na_2SiO_3.9H_2O$: 1.5CTAC: 730$H_2O$. Typically, 1.6 g of $Na_2SiO_3.9H_2O$ is dissolved in 55.2 g $H_2O$, taken in a high density polypropylene (HD-PP) bottle, under stirring for 15 minutes. Separately, 16 g of concentrated HCl is slowly added to 11.2 g CTAC taken in HD-PP bottle and stirred for 2 minutes. The clear sodium silicate solution is then slowly added to CTAC/1-HCl solution and stirred for 5 minutes. The resulting sol is maintained at fixed temperature −15° C.-70° C., depending on the desired ratio between the fibers and discoids) for 3-24 hours under quiescent conditions. The product is recovered either by filtration (for example, using a Buckner funnel under vacuum) or by centrifugation, then washed several times with distilled water, and subsequently, dried for several hours. Depending on the desired applications, the as-synthesized discoids can be used directly, or calcined through a procedure known to one skilled in art.

To characterize the particles, the powder x-ray diffraction (XRD) patterns on the particles are collected on a Bruker D8 X-Ray diffractometer using CuKα radiation (40 kV, 40 mA). The scanning electron microscopy (SEM) images are collected on a JEOL 6300 instrument operating at 15 kV. Prior to the measurements, the samples are coated with gold for 1 minute in an Anatech hummer 6.2 sputtering system operating at 40 millitorr. The transmission electron microscopic (TEM) images of the calcined particles are recorded on a JEM 2010 electron microscope (JEOL) at an acceleration voltage of 200 kV. The samples are prepared by dispersing the calcined material in water at room temperature. A few drops of this dispersion were placed on a holey carbon-coated mesh and dried at room temperature. The $N_2$ adsorption/desorption isotherms of the calcined mesoporous silica samples are measured at 77 K on a NOVA 1200e instrument (Quantachrome Co.). Before the measurement, samples are degassed at 350° C. and 10 Pa for at least 12 h. The confocal laser microscopy images of the fluorescent particles are taken on a Nikon. D-Eclipse CI-Microscope. Rhodamine 6G (R6G, Exciton) fluorescent dye tilled mesoporous silica discoids are prepared from the sol of molar composition $1Na_2SiO_3.9H_2O$: 1.5CTAC: 28HCl: 729$H_2O$: 0.002R60, that is the same as above, except for the addition of the dye. The dye is at first dissolved in water together with sodium silicate and the resulting solution is added to CTAC/HCl sol, as described above.

The morphology of the synthesized mesoporous silica particles is strongly dependent upon the molar composition of the synthesis sol used in this example. The mostly well-formed fibers of varying sizes as shown in the scanning electron microscopy (SEM) image of FIG. 1 (A) are obtained at room temperature from the sol of molar composition $1Na_2SiO_3.9H_2O$: 1.5CTAC: 730$H_2O$. We have observed that this low curvature fibers begins to disappear with concomitant formation of high curvature and well-formed, single-crystal like 3-5 μm sized discoids upon increasing the synthesis temperature [See FIGS. 1 (B)-(C)] and eventually the fiber to discoid transformation is complete at synthesis temperatures between 60 to 90° C.

FIG. 1 illustrates scanning electron microscopy (SEM) images of (A) mixture of mesoporous silica fibers synthesized from the sol of molar composition $1Na_2SiO_3.9H_2O$: 1.5CTAC: 28HCl: 729$H_2O$ at 25° C., 24 hours and FIGS. 1 (B) and (C) illustrate mesoporous silica discoids synthesized from the same sol but at a range between 70° C. and 90° C., 24 h (D) calcined discoids.

Figure 2:
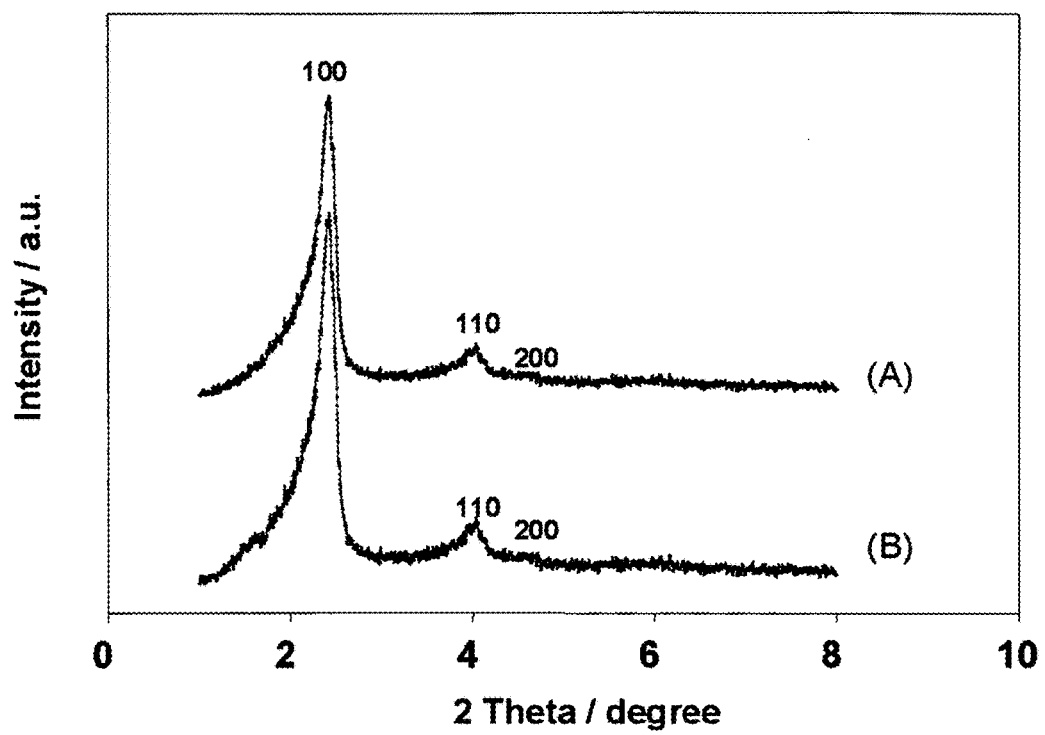
FIG. 2 illustrates the x-ray diffraction (XRD) pattern of the mesoporous silica fibers (A) and discoids (B) synthesized from the sol of molar composition $1Na_2SiO_3.9H_2O$: 1.5CTAC: 28HCl: 729$H_2O$, at 25° C., 24 h and 70° C., 24 hours respectively.

The hexagonal p6 mm structure of the fibers and discoids is established from x-ray diffraction (XRD) measurement as illustrated by the patterns in FIGS. 2 (A) and (B), respectively. The $d_{100}$ spacing of ca. 46 Å and 47 Å was obtained for fibers and discoids, respectively. Calcination at up to 500° C. does not have any noticeable effect on the morphology of the particles as confirmed by the scanning electron microscopy (SEM) images of as-formed and calcined discoids illustrated in FIGS. 1 (C) and (D), respectively.

FIG. 2 illustrates an x-ray diffraction (XRD) pattern of the mesoporous silica fibers (A) and discoids (B) synthesized from the sol of molar composition $1Na_2SiO_3.9H_2O$: 1.5CTAC: 28HCl: 729$H_2O$, at 25° C., 24 hours and 70° C., 24 hours, respectively.

Figure 3:
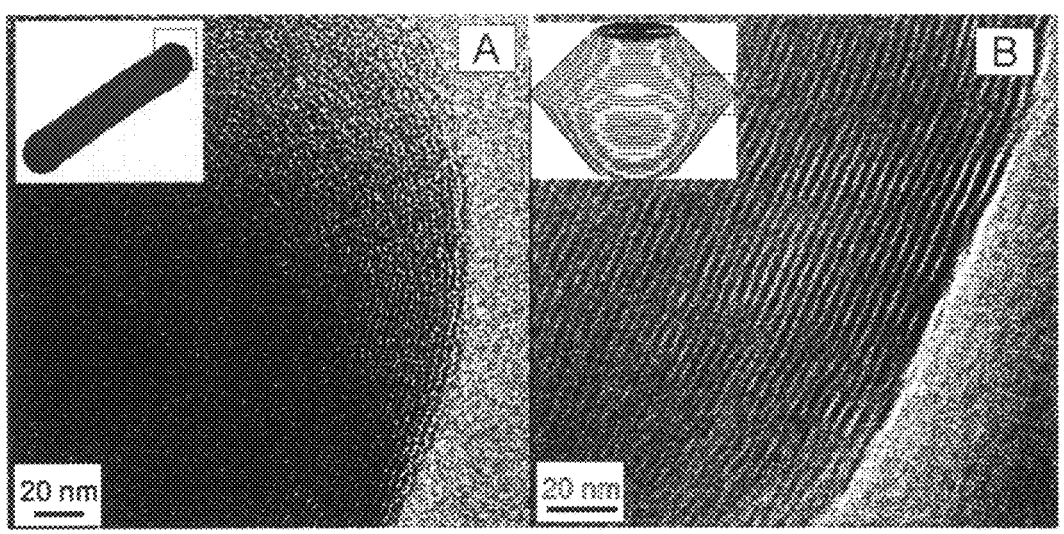
FIG. 3(A) and FIG. 3(B) illustrate transmission electron microscopic (TEM) images of the fibers (A) and discoids (B), showing the internal circular architecture and pore channels running around the particle axis.

The pore architecture in the particle mesostructure is established from the transmission electron microscopic (TEM) images for fibers and discoids shown in FIG. 3. These images present a well-organized, hexagonal, p6 mm structure with hexagonally organized pores and possess a circular architecture with pore channels running around the fiber or discoid axis endowing self-sealed structure to the particles. The diameter of the channels obtained from transmission electron microscopic (TEM) was found to be well in agreement with that obtained from $N_2$ adsorption/desorption measurement vide infra.

FIG. 3 illustrates transmission electron microscopic (TEM) images of the fibers (A) and discoids (B), showing the internal circular architecture and pore channels running around the particle axis. The mesoporous silica fibers and discoids were synthesized from the sol of molar composition $1Na_2SiO_3.9H_2O$: 1.5CTAC: 28HCl: 729$H_2O$ at 25° C., 24 hours and 70° C., 24 hours, respectively. The insets here are the schematics of fibers and discoids, respectively.

Figure 4:
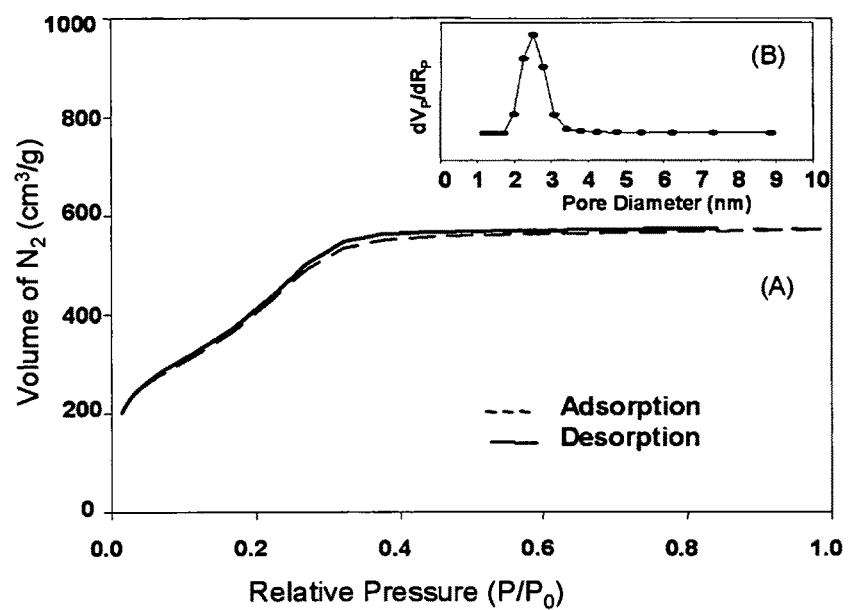
FIG. 4 illustrates $N_2$ adsorption/desorption isotherm measured at 77 K on calcined mesoporous silica fibers synthesized from the sol of molar composition $1Na_2SiO_3.9H_2O$: 1.5CTAC: 28HCl: 729$H_2O$ at 25° C., 24 hours, with inset (B) illustrating the pore size distribution for the discoids.
Figure 5:
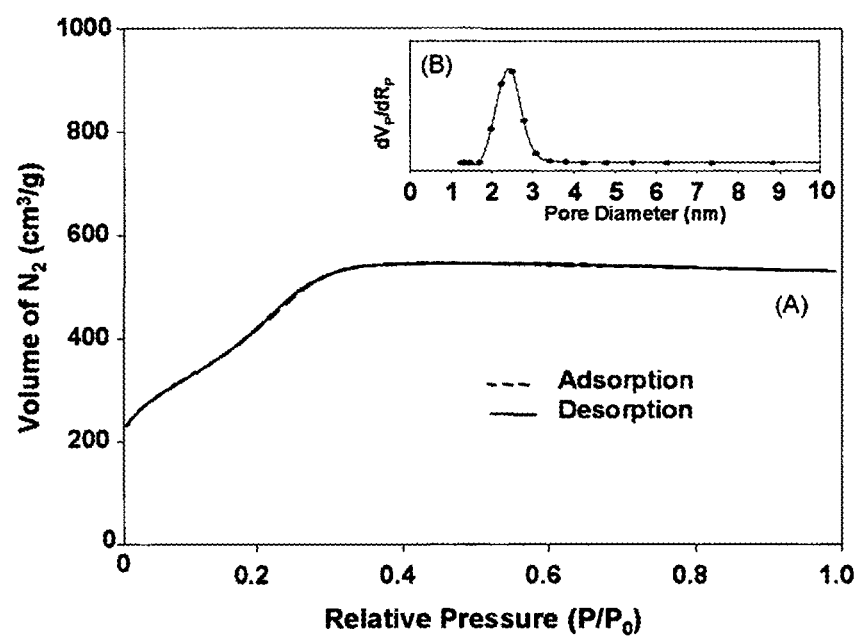
FIG. 5 illustrates $N_2$ adsorption/desorption isotherm measured at 77 K on calcined mesoporous silica discoids synthesized from the sol of molar composition $1Na_2SiO_3.9H_2O$: 1.5CTAC: 28HCl: 729$H_2O$ at 70° C., 24 hours, with insets (B) illustrating the pore size distribution for the discoids.

A nitrogen adsorption/desorption measurement conducted at 77.3 K. on the calcined fibers and discoids gives type IV isotherms as shown in FIGS. 4 and 5, respectively.

There is little difference between the texture properties of fibers and discoids. Both the isotherms showed a step rise at ~0.2 P/$P_0$ with little hysteresis, that is typical of high quality mesoporous materials. The mesopore size is estimated, see FIGS. 4 (B) and 5 (B), from the adsorption branch of the isotherm according to the correlation obtained from Non-linear Fluctuation-Dissipation Theorem (NLDFT) theory. See A. V. Neimark et al., and M. Jaroniec et al., both listed in the reference list below and both hereby incorporated herein by reference. For fibers and discoids, the BET surface areas are 1330 and 1250 m²/g; mesopore diameters are 2.4 nm and 2.5 nm, and pore volumes are 0.93 cm³ and 0.96 cm³/g, respectively.

FIG. 4 illustrates $N_2$ adsorption/desorption isotherm measured at 77 K on calcined mesoporous silica fibers synthesized from the sol of molar composition I $Na_2SiO_3.9H_2O$: 1.5CTAC: 28HCl: 729$H_2O$ 25° C., 24 h. Inset (B) illustrates the pore size distribution for the discoids.

FIG. 5 illustrates $N_2$ adsorption/desorption isotherm measured at 77 K on calcined mesoporous silica discoids synthesized from the sol of molar composition $1Na_2SiO_3 \cdot 9H_2O$: 1.5CTAC: 28 HCL: $729H_2O$ at 70° C., 24 h. Inset (B) illustrates the pore size distribution for the discoids.

Figure 6:
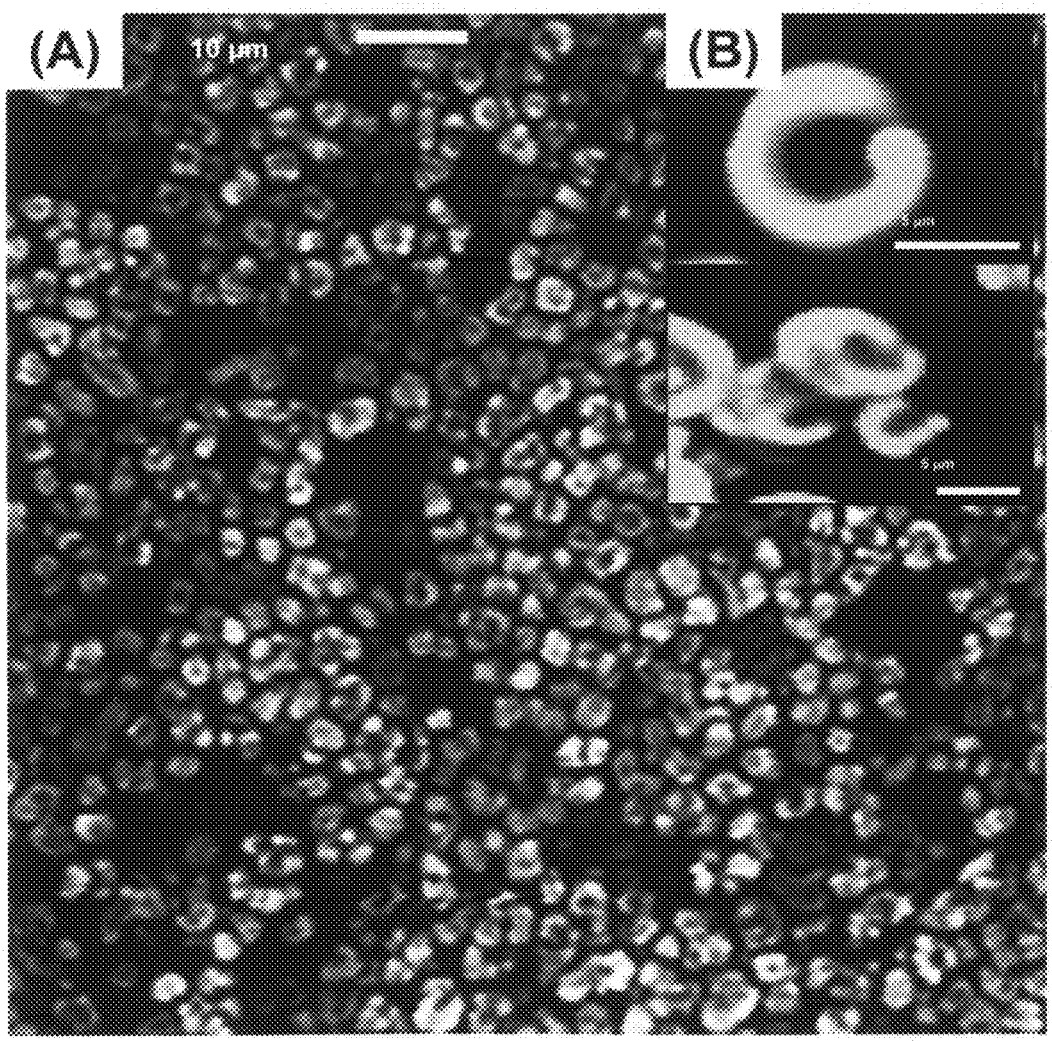
FIG. 6 illustrates confocal laser microscopy images at different magnifications of the dye-filled mesoporous silica discoids synthesized from the sol of molar composition $1Na_2SiO_3.9H_2O$: 1.5CTAC: 28HCl: 729$H_2O$: 0.002R6G at 70° C. 24 h with inset (B) illustrating a magnified image showing the coiled silica tubes forming discoids.

To elucidate further, the coiling of fibers, the R6G dye loaded discoids are observed by confocal laser microscopy. These images, illustrated in FIG. 6, confirm the coiled macroscopic domains in the discoids as shown by the bright fluorescence of the curled up coiled rods, indicated by arrows in FIG. 6 (B). This result is also in agreement with the scanning electron microscopy (SEM) and transmission electron microscopic (TEM) observations. Moreover, higher temperature promotes formation of curved fibers by balancing free energy of the fibers with the entropic term as reported earlier. See Y. Kievsky et al. and I. Sokolov et al. both listed in the reference list below and both hereby incorporated herein by reference.

FIG. 6(A) illustrates confocal laser microscopy images at different magnifications of the dye filled mesoporous silica discoids synthesized from the sol of molar composition $1Na_2SiO_3 \cdot 9H_2O$: 1.5CTAC: 28HCl: $729H_2O$: 0.002R6G at 70° C., 24 hours. Inset (B) is a magnified image illustrating the coiled silica tubes forming discoids.

Thus, the method described above synthesizes mesoporous single-crystal like with hexagonally organized pores and possess a circular architecture with pore channels running around the fiber or discoid endowing self-sealed-type structure to the particles. For fibers and discoids of this Example 1, the BET surface areas are 1330 $m^2/g$ and 1250 $m^2/g$; mesopore diameters are 2.4 nm and 2.5 nm, and pore volumes are 0.93 $cm^3$ and 0.96 $cm^3/g$, respectively.

Example 2: Synthesis of Spheres, Discoids, Fibers

In this Example 2, mesoporous silica particles are synthesized by using disodium trioxosilicate ($Na_2SiO_3 \cdot 9H_2O$. Fishcer Scientific) as the silica source, cetyltrimethylammonium chloride (CTAC, 25% aqueous, Aldrich) as an example of the structure directed agent (SDA) in the presence or absence of formamide (Aldrich) and hydrochloric acid (J T Baker) as a catalyst.

Mesoporous silica spheres can be synthesized in the absence of HCl from sols of molar compositions $1Na_2SiO_3 \cdot 9H_2O$: 5-32 $CH_3NO$: 0.5-0.8 CTAC: $210H_2O$; spheres exemplified here are prepared from the sol of molar composition $1Na_2SiO_3 \cdot 9H_2O$: 22 $CH_3NO$: 0.5 CTAC: $210H_2O$.

For the synthesis of discoids, the molar composition of the sol is maintained at 1 $Na_2SiO_3 \cdot 9H_2O$: 0.5-0.8 CTAC: $210H_2O$: 16 HCl: whereas, origami shapes are synthesized from the sol of molar composition $1Na_2SiO_3 \cdot 9H_2O$: 5-32 $CH_3NO$: 0.5-0.8 CTAC: $210H_2O$: 16 HCl.

A calculated amount of $Na_2SiO_3 \cdot 9H_2O$ is dissolved in distilled water under stirring for 15 minutes, CTAC solution is then slowly added, followed by the addition of $CH_3NO$ and/or HCl, whenever required. The stirring is continued for another several minutes. The clear sol thus formed is maintained at room temperature, without stiffing, for duration of between several hours to one week. The product is recovered either by filtration (for example, using a Buckner funnel under vacuum) or by centrifugation, then washed several times with distilled water, and subsequently, dried for several hours. Depending on desired applications, the as-synthesized discoids can be used directly, or calcined through a procedure known to one skilled in art.

To characterize the collected product, the powder x-ray diffraction (XRD) patterns on the as-synthesized materials are collected on an MO3X-HF (Bruker AXS) instrument using CuKα radiation (40 kV, 40 mA). The scanning electron microscopy (SEM) images are collected on a JEOL 6300 instrument operating at 15 Kv. Prior to the measurements, the samples are coated with gold for 1 minute in an Anatech hummer 6.2 sputtering system operating at 40 millitorr. The transmission electron microscopic (TEM) images of the calcined particles are recorded on a JEM 2010 electron microscope (JEOL) at an acceleration voltage of 200 kV.

Figure 7:
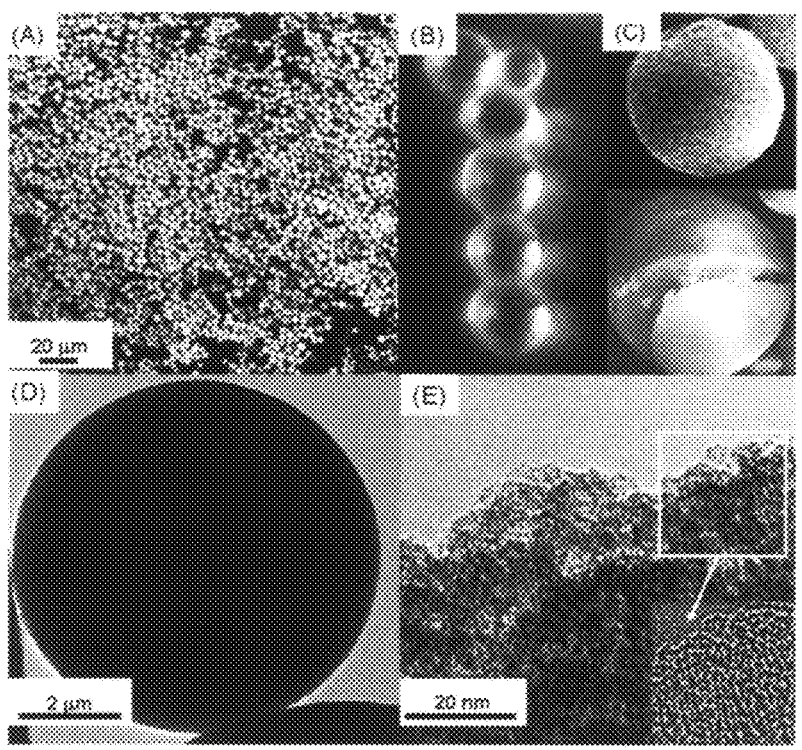
FIGS. 7 (D) and (E) illustrate the transmission electron microscopic (TEM) images of the spheres.

The samples for characterization are prepared by dispersing the calcined material in water at room temperature. A few drops of this dispersion were placed on a holey carbon-coated mesh and dried at room temperature. Dynamic light scattering (DLS) measurements on the sol are performed using BIC model 90Plus Particle Size Analyzer at 20° C. Optical microscopy, scanning electron microscopy (SEM) and transmission electron microscopic (TEM) images of the as-synthesized and calcined spheres synthesized from the sol of molar composition $1Na_2SiO_3 \cdot 9H_2O$: 21.69 $CH_3NO$: 0.51-CTAC: $210H_2O$, are illustrated in FIGS. 7 (A)-(B), 7 (C), and (D, E), respectively. There is no obvious change in the morphology of the spheres after calcination. However, a few spheres have been found to be damaged or broken, as illustrated in the inset scanning electron microscopy (SEM) image of FIG. 7 (C). The average size of the spheres was ca. 4-6 μm. The spheres are hard and have a dense internal structure as confirmed from the transmission electron microscopic (TEM) image in FIG. 7 (D). The mesoporous structure in the surface of the sphere is confirmed from the transmission electron microscopic (TEM) image illustrated in FIG. 7 (E). Although spheres can be synthesized under a range of molar compositions $1Na_2SiO_3 \cdot 9H_2O$: 5-32 $CH_3NO$: 0.5-0.8 CTAC: $210H_2O$, their size and distribution is strongly dependent on the sol's molar composition. For example, doubling the amount of formamide will decrease the average 2-1-of the spheres by ~2 μm.

Figure 8:
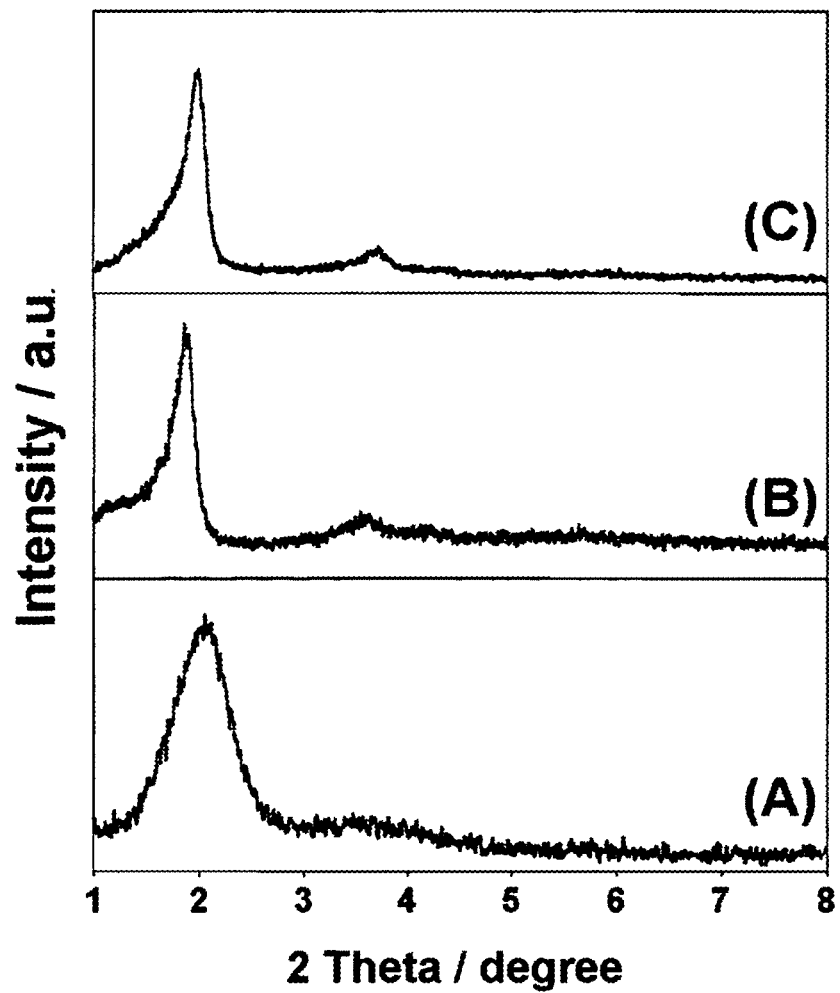
FIGS. 8 (A)-(C) illustrate the x-ray diffraction (XRD) patterns of the spheres, discoids and origami particles synthesized from the sols of molar compositions $1Na_2SiO_3.9H_2O$: 5.21-31.51 $CH_3NO$: 0.56-0.77 CTAC: $210H_2O$; $1Na_2SiO_3.9H_2O$: 0.56-0.77 CTAC: 210 $H_2O$: 16.35 HCl, and $1Na_2SiO3.9H_2O$: 5.21-31.51 CH3NO: 0.56-0.77 CTAC: $210H_2O$: 16.35 HCl, respectively.

The mesoporous structure of the spheres is confirmed from the x-ray diffraction (XRD) pattern illustrated in FIG. 8 (A). The $d_{100}$-spacing of ca. 44 Å is obtained, corresponding to the hexagonal p6 mm structure.

FIG. 7 (A)-(B) illustrate the scanning electron microscopy (SEM) images of the as-synthesized and calcined spheres obtained from the sol of molar composition 1 $Na_2SiO_3 \cdot 9H_2O$: 21.69 $CH_3NO$: 0.51 CTAC: $2H_2O$. Figure (C) and (D) are the transmission electron microscopic (TEM) images of the spheres. The inset in FIG. 7(B) is the scanning electron microscopy (SEM) image of an individual broken sphere.

FIGS. 8 (A)-(C) illustrate the x-ray diffraction (XRD) patterns of the spheres, discoids and origami particles synthesized from the sols of molar compositions $1Na_2SiO_3 \cdot 9H_2O$: 5-32 $CH_3NO$: 0.5-0.8 CTAC: $210H_2O$; $1Na_2SiO_3 \cdot 9H_2O$: 0.5-0.8 CTAC: $210H_2O$: 16 HCl, and 1 $Na_2SiO_3 \cdot 9H_2O$: 5-32 $CH_3NO$: 0.5-0.8 CTAC: $210H_2O$: 16 HCl, respectively.

Figure 9:
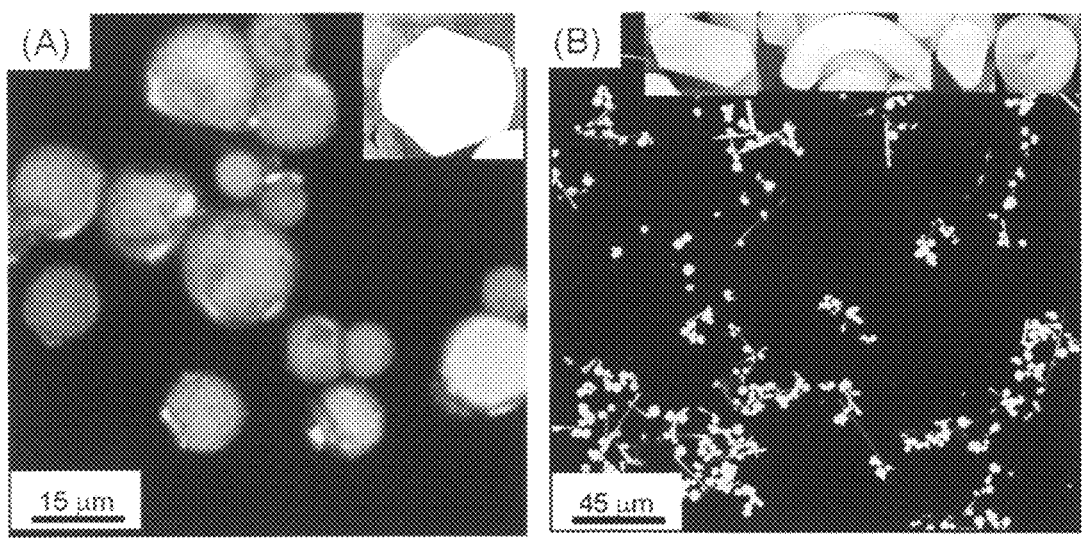
FIGS. 9 (A) and (B) illustrate the confocal microscopy images of discoids and origami particles synthesized from the sols of molar $1Na_2SiO_3.9H_2O$: 0.56-0.77 CTAC: $210H_2O$: 16.35 HCl and $1Na_2SiO_3.9H_2O$: 5.21-31.51 $CH_3NO$: 0.56-0.77 CTAC: $210H_2O$: 16.35 HCl, respectively, with insets in the images displaying individual particles.

The discoids and origami particles obtained here have been employed for encapsulating florescent dyes in the mesochannels channels. The confocal microscopy images of these particles are illustrated in FIGS. 9 (A) and (B), respectively. The strong fluorescence radiated by these particles is very clear from these images. The morphologies of the discoid and some of the origami particles are also shown as insets of the FIGS. 9(A) and (B), respectively.

The hexagonal p6 mm structure of the discoids and origami particles is confirmed from their x-ray diffraction (XRD) patterns shown in FIGS. 8 (B) and (C), respectively. The $d_{100}$-spacings of ca. 47 Å and 45 Å is obtained for gyroids and origami, respectively.

Figure 10:
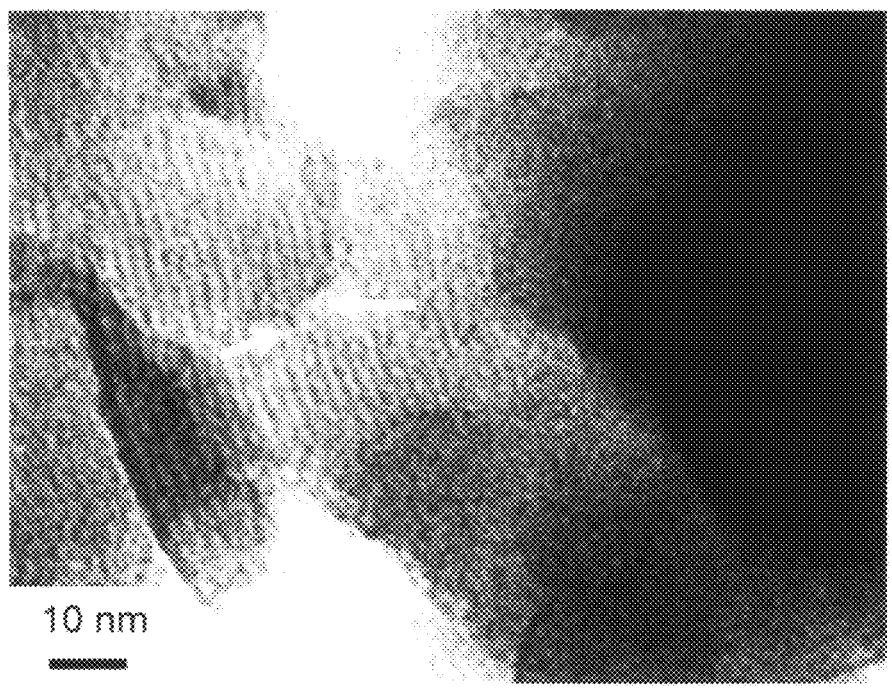
FIG. 10 illustrates a cross-sectional transmission electron microscopic (TEM) image of the gyroids particle synthesized from the sol of molar composition $1Na_2SiO_3.9H_2O$: 0.56-0.77 CTAC: $210H_2O$: 16.35 HCl.

As confirmed from the cross-sectional transmission electron microscopic (TEM) image illustrated in FIG. 10 of the discoids, the mesoporous channels indeed run in circular or concentric fashion.

FIGS. 9 (A) and (B) illustrate the confocal microscopy images of discoids and origami particles synthesized from the sots of molar $1Na_2SiO_3.9H_2O$: 0.5-0.8 CTAC: $210H_2O$: 16 HCl and $1Na_2SiO_3.9H_2O$: 5-32 $CH_3NO$: 0.5-0.8 CTAC: $210H_2O$: 16 HCl, respectively. The insets in the images of FIG. 9(B) display individual particles.

FIG. 10 illustrates the cross-sectional transmission electron microscopic (TEM) image of the gyroids particle synthesized from the sol of molar composition 1 $Na_2SiO_3.9H_2O$: 0.5-0.8 CTAC: $210H_2O$: 16 HCl.

Figure 11:
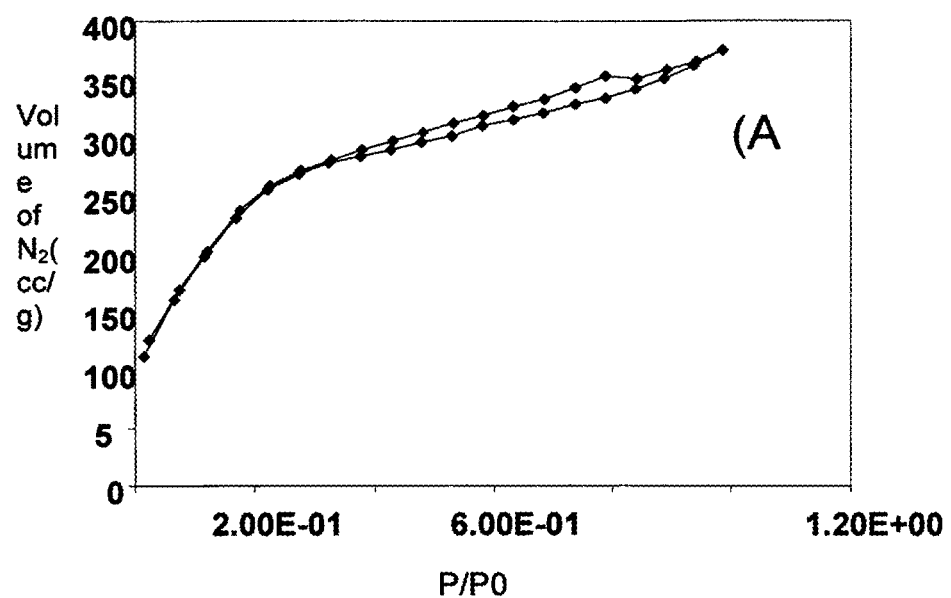
FIG. 11 illustrates a $N_2$ adsorption/desorption plot.

BET (gas absorption) measurements, illustrated in FIG. 11, demonstrate that bulk mesoporous material has been produced. FIG. 11 is a $N_2$ adsorption/desorption plot (the type of the plot is indicative of mesoporous material).

From the above measurements, one can find that for the spheres, the surface area of the spheres is at least 600 m$^2$/g, the pore diameter and pore volumes are 3.3 nm, and 0.3 cm$^3$/g, respectively. For discoids and origami, the surface areas of the particles is at 500-900 m$^2$/g, whereas the pore diameter and volume were in the range of 2.4-3.3 nm, and 0.2-0.4 cm$^3$/g, respectively.

The particles synthesized by the processes described can be used: as filler for chromatography columns; for slow release of various chemicals (slow drug release) or as absorbents for various chemicals such as antibacterial agents, anti-rusting, or glue for self-healing materials, etc.

The illustrative embodiments and modifications thereto described hereinabove are merely exemplary. It is understood that other modifications to the illustrative embodiments will readily occur to persons of ordinary skill in the art. All such modifications and variations are deemed to be within the scope and spirit of the present invention as will be defined by the accompanying claims.

REFERENCES

[1] T. Yanagisawa, T. Shimizu. K., Kuroda, C. Kato, Bull. Chem. Soc. Jpn. 63, 4, (1990) 988:
[2] C. T. Kresge. M. E. Leonowicz, W. J. Roth, J. C. Vartuli, J. S. Beck, Nature 6397 (1992) 710.
[3] J. S. Beck, J. C. Vartuli, W. J. Roth, M. E. Leonowicz, C. T. Kresge, K. D. Schmitt, C. T. W. Chu, D. H. Olson, E. W. Sheppard, S. B. Mc Cullen. J. B., Higgins, J. L. Schlenker, J. Am. Chem. Soc. 114 (1992) 10834.
[4] D. Zhao, J. Feng, Q. Huo, N. Melosh, G. Fredrickson, B. Chmelka, G. Stucky, Science, 279 (1998) 548.
[5] D. Zhao, Q. Huo, J. Feng, B. Chmelka, G. Stucky, J. Am. Chem. Soc. 120 (1998) 6024.
[6] H. Yang. N. Coombs. G. A. Ozin, Nature, 386 (1997) 692.
[7] B. J. Scott, G. Wirnsberger, G. D. Stucky, Chem. Mater. 13 (2001) 3140.
[8] F. Marlow, M. D. McGehee, D. Zhao, B. F. Chmelka, G. D. Stucky, Adv. Mater. 11, 8 (1999) 632.
[9] I. Sokolov, Y. Kievsky, J. Kaszpurenko, Small, 3 (2007) 419.
[10] G. A. Ozin, H. Yang, I. Sokolov, N. Coombs, Adv. Mater. 9 (1997) 662.
[11] Q. Hu, D. Zhao, J. Feng, K. Weston, S. K. Buratto, G. D. Stucky, S. Schacht, F. Schuth, Adv. Mater. 9 (1997) 974.
[12] S. Schacht, Q. Hou. I. G. Voigt-Martin, G. D. Stucky. F. SchOth, Science 273 (1997) 768.
[13] X. Pang, J. Ciao, F. Tang, J. of Non-Crystalline Solids, 351 (2005) 1705.
[14] K. Kosuge, T. Sato, N. Kikukawa, M. Takemori, Chem. Mater. 16 (2004) 899.
[15] X. Pang, F. Tang, Microporous and Mesoporous Mater. 85 (2005) 1.
[16] S. Han, W. Hou. W. Dang, J. Xu, J. Hu, D. Li, Colloid Polym Sci, 282 (2000) 761.
[17] S. P. Naik and I. Sokolov (Communicated).
[18] Y. S. Lin. C. P. Tsai, H. Y. Huang, C. T. Kuo, Y. Hung, D. M. Huang, Y. C. Chen. C. Y. Mou, Chem. Mater. 17 (2005) 4570.
[19] A. Berggren, A. E. C. Palmqvist and K. Holmberg, Soft Matter, 1 (2005) 219.
[20] A. V. Neimark, P. 1. Ravvikovitch, Microporous Mesoporous Mater. 44 (2001) 44, 697.
[21] M. Jaroniec, M. Kruck, J. P. Olievier, Langmuir, 15 (1999) 5410.
[22] Y. Kievsky and 1. Sokolov, IEEE Transactions on Nanotechnology, 4, 5 (2005) 490.
[23]. 1. Sokolov and Y. Kievsky, Studies in Surface Science and Catalysis, 156 (2005) 433.

We claim:

1. A method for preparation of nanoporous silica particles, having a self-sealed property, comprising either nanoporous silica spheres, nanoporous silica discoids, or a mixture of nanoporous silica spheres and nanoporous silica discoids, the method comprising the steps of:
    combining sodium silicate, an aqueous solvent, an acidic catalyst, and a structure directed agent (SDA) into a precursor solution; and
    forming said nanoporous silica spheres and/or nanoporous silica discoids via a molecular self-assembly process, wherein each particle is formed by a plurality of hexagonally organized pore channels running along the circumference of the particle axis forming the shape of the particle, wherein the ends of these hexagonally organized pore channels join together, such that the nanoporous particles are self-sealed, the process comprising the step of incubating said precursor solution at a predetermined temperature for a predetermined amount of time in order to obtain said self-sealed nanoporous spheres and/or discoids; and
    collecting said nanoporous silica spheres and/or discoids using gravitational precipitation, centrifugation, filtration, dialysis, and/or a combination thereof.

2. The method of claim 1 in which the structure directed agent (SDA) comprises an ionic surfactant, a copolymer surfactant, or a mix of said ionic and copolymer surfactants.

3. The method of claim 2, wherein said surfactant is cetyltrimethylammonium chloride, cetyltrimethylammonium bromide, or plurionic acid.

4. The method of claim 1, further comprising condensation catalyst selected from the group consisting of hydrochloric acid, nitric acid sulfuric acid, phosphoric acid, and a combination of said hydrochloric, nitric, and/or sulfuric acids.

5. The method of claim 1, wherein said synthesis is carried out using molar sol composition: $1Na_2SiO_3.9H_2O$: X CTAC: Y HCl: Z $H_2O$.

6. The method of claim 5, wherein X is within a range of 0.5-3, and Y is within a range of 10-70, and Z is within a range of 600-800.

7. The method of claim 5, wherein a surface area of said particles is greater than 1000 m$^2$/g; pore diameters are 2.4-2.5 nm, and pore volumes are 0.93-0.96 cm$^3$/g.

8. The method of claim 1, wherein said forming step is performed at a temperature chosen within a 60-90° C. range in order to synthesize preferentially nanoporous silica discoids.

9. A method of preparation of nanoporous silica particles, having a self-sealed property, formed as nanoporous silica spheres and/or nanoporous silica discoids, the method comprising the steps of:
combining an inorganic silica precursor, sodium silicate, an aqueous solvent, an acidic catalyst mixed with formamide, and a structure directed agent (SDA) into a precursor solution; and
forming said nanoporous silica spheres and/or nanoporous silica discoids via a molecular self-assembly process, wherein each particle is formed by a plurality of hexagonally organized pore channels running along the circumference of the particle axis forming the shape of the particle, wherein the ends of these hexagonally organized pore channels join together, such that the nanoporous particles are self-sealed, the process comprising the step of incubating said precursor solution at a predetermined temperature; and
collecting said nanoporous silica spheres and/or discoids using gravitational precipitation, centrifugation, filtration, dialysis, and/or a combination thereof.

10. The method of claim 9, wherein said structure directed agent (SDA) is selected between an ionic surfactant, a copolymer surfactant, or a mix of said surfactants.

11. The method of claim 10, wherein said surfactant is cetyltrimethylammonium chloride, cetyltrimethylammonium bromide, or plurionic acid.

12. The method of claim 9, further comprising a condensation catalyst is selected from the group consisting of hydrochloric acid, nitric acid, sulfuric acid, phosphoric acid, and a combination of said hydrochloric acid, nitric acid, sulfuric acid, and/or phosphoric acids.

13. The method of claim 9, wherein said synthesis of nanoporous silica spheres is carried out using molar sol composition: 1Na$_2$SiO$_3$.9H$_2$O: X CH$_3$NO: Y CTAC: 210H$_2$O.

14. The method of claim 13, wherein X is in a range 5-32, and Y is in a range of 0.5-0.8.

15. The method of claim 14, wherein said synthesis of nanoporous silica spheres uses said molar sol composition: 1Na$_2$SiO$_3$.9H$_2$O: 22 CH$_3$NO: 0.5 CTAC: 210H$_2$O.

16. The method of claim 15, wherein a surface area of the nanoporous silica spheres is at least 600 m$^2$/g, and the pore diameter and pore volume are 3.3 nm and 0.3 cm$^3$/g, respectively.

17. The method of claim 9, wherein said synthesis of said nanoporous silica discoids is synthesized from sols of molar compositions 1Na$_2$SiO$_3$.9H$_2$O: 0.5-0.8 CTAC: 210H$_2$O: 16 HCl.

18. The method of claim 9, wherein said synthesis of said nanoporous silica origami particles is synthesized from the sols of molar compositions 1 Na$_2$SiO$_3$.9H$_2$O: 5-32 CH$_3$NO: 0.5-0.8 CTAC: 210H$_2$O: 16 HCl.

19. The method of claim 17, wherein a surface area of said nanoporous silica origami-shape particulates is at 500-900 m$^2$/g, a pore diameter and volume are in a range of 2.4-3.3 nm and 0.2-0.4 cm$^3$/g, respectively.

20. The method of claim 18, wherein a surface area of the nanoporous silica origami-shape particulates is at 500-900 m$^2$/g, a pore diameter and volume are in the range of 2.4-3.3 nm and 0.2-0.4 cm$^3$/g, respectively.

21. A method of synthesizing nanoporous silica spheres and discoids, having a self-sealed property, the method comprising the steps of:
combining, into a precursor solution, an inorganic silica precursor, disodium trioxosilicate (Na$_2$SiO$_3$.9H$_2$O) as a silica source, an aqueous solvent, cetyltrimethylammonium chloride or bromide as a structure directed agent (SDA), and hydrochloric acid as a catalyst, wherein the molar sol composition of the precursor solution is 1Na$_2$SiO$_3$.9H$_2$O: 0.5-3CTAC: 10-70HCl: 600-800H$_2$O; and
forming said nanoporous silica spheres and discoids via a molecular self-assembly process, wherein each particle is formed by a plurality of hexagonally organized pore channels running along the circumference of the particle axis forming the shape of the particle, wherein the ends of these hexagonally organized pore channels join together, such that the nanoporous particles are self-sealed, the process comprising the step of incubating said precursor solution at a predetermined temperature; and
collecting said nanoporous silica spheres and discoids using gravitational precipitation, centrifugation, filtration, dialysis, and/or a combination thereof.

22. The method of claim 21, wherein said molar sol composition comprises 1Na$_2$SiO$_3$.9H$_2$O: 1.5CTAC: 28HCl: 730H$_2$O.

23. The method of claim 22, wherein said method comprises the step of dissolving 1.6 g of Na$_2$SiO$_3$.9H$_2$O in 55.2 g H$_2$O in a high density polypropylene (HDPP) bottle and stirring for 15 minutes.

24. The method of claim 23, wherein said method comprises the step of slowly adding 16 g of concentrated HCl 11.2 g CTAC in a HDPP bottle and stirring for 2 minutes.

25. The method of claim 24, wherein said method comprises the step of slowly adding said clear sodium silicate solution to said CTAC/HCl solution and stirring for 5 minutes.

26. The method of claim 24, wherein said method comprises the step of maintaining a resulting sol at fixed temperature between 15° to 70° C. for 3-24 hours under quiescent conditions.

27. The method of claim 26, wherein said method comprises the step of recovering a product by filtration, then washing times with distilled water, and subsequently, drying for several hours a range of 1-6 hours.

28. A method of synthesizing mesoporous silica particles, having a self-sealed property, the method comprising the steps of:
combining, into a precursor solution, an inorganic silica precursor, disodium trioxosilicate (Na$_2$SiO$_3$.9H$_2$O) as an silica source, an aqueous solvent, cetyltrimethylammonium chloride or bromide as a structure directed agent (SDA), and hydrochloric acid as a catalyst, wherein said precursor solution may optionally comprise formamide; and
forming said mesoporous silica particles via a molecular self-assembly process, wherein each particle is formed by a plurality of hexagonally organized pore channels running along the circumference of the particle axis forming the shape of the particle, wherein the ends of these hexagonally organized pore channels join together, such that the nanoporous particles are self-sealed, the process comprising the step of incubating said precursor solution at a predetermined temperature; and collecting said nanoporous silica particles using gravitational precipitation, centrifugation, filtration, dialysis, and/or a combination thereof.

29. The method of claim 28, wherein said method comprises the step of synthesizing mesoporous silica spheres in the absence of HCl from sols of molar compositions $1Na_2SiO_3.9H_2O$: 5-32 $CH_3NO$: 0.5-0.8 CTAC: $210H_2O$.

30. The method of claim 29, wherein said spheres are prepared from said sol of molar composition $1Na_2SiO_3.9H_2O$: 22 $CH_3NO$: 0.5 CTAC: $210H_2O$.

31. The method of claim 28, wherein a synthesis of discoids, uses a molar composition of the sol maintained at $1Na_2SiO_3.9H_2O$: 0.5-0.8 CTAC: $210H_2O$: 16 HCl.

32. The method of claim 21, wherein said nanoporous spheres or discoids comprise a pore size in the range of 2.4 to 2.5 nanometers, said nanoporous spheres or discoids comprise a surface area more than 1000 $m^2/g$.

33. The method of claim 9 wherein said spheres and/or discoids comprise a pore size of 3.3 nanometers, said spheres and/or discoids comprise a surface area more than 500 $m^2/g$.

\* \* \* \* \*